United States Patent
Kikuchi et al.

(10) Patent No.: US 6,518,555 B1
(45) Date of Patent: *Feb. 11, 2003

(54) POLARIZATION HOLOGRAM LENS, OPTICAL PICKUP, INFORMATION REPRODUCTION APPARATUS AND INFORMATION RECORDING APPARATUS

(75) Inventors: Ikuya Kikuchi, Tsurugashima (JP); Yoshitsugu Araki, Tsurugashima (JP)

(73) Assignee: Pioneer Electronic Corporation, Tokyo-to (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,753

(22) Filed: Mar. 17, 1999

(30) Foreign Application Priority Data

Mar. 20, 1998 (JP) .......................................... 10-072796

(51) Int. Cl.[7] .............................................. G01B 27/40
(52) U.S. Cl. .............................. 250/201.5; 250/237 G; 369/103; 359/569
(58) Field of Search .............................. 250/201.5, 550, 250/570, 216, 225, 237 G, 237 R; 369/103, 109–112, 112.03–112.19, 44.23, 44.24; 359/19, 15, 569, 570

(56) References Cited

U.S. PATENT DOCUMENTS

| | | | |
|---|---|---|---|
| 5,615,203 A | * | 3/1997 | Fukakusa ..................... 369/244 |
| 5,748,603 A | * | 5/1998 | Kim et al. ............. 369/112.02 |
| 5,896,360 A | * | 4/1999 | Horimai ................. 369/112.12 |
| 5,930,219 A | * | 7/1999 | Kim ........................... 369/109 |
| 5,986,996 A | * | 11/1999 | Kitamura et al. ........... 369/116 |

* cited by examiner

Primary Examiner—Que T. Le
Assistant Examiner—Thanh X. Luu
(74) Attorney, Agent, or Firm—Nixon & Vanderhye P.C.

(57) ABSTRACT

A polarization hologram lens includes: a first portion, positioned at a center of the hologram lens, on which no grating pattern is formed; and a second portion, positioned at an outer circumferential area of the first portion, on which grating patterns are formed, wherein the grating patterns do not diffract a light beam of a first polarization direction, and wherein the grating patterns diffract a light beam of a second polarization direction perpendicular to the first polarization direction to produce a diverging diffracted light or a converging diffracted light.

17 Claims, 6 Drawing Sheets

FIG. 2A
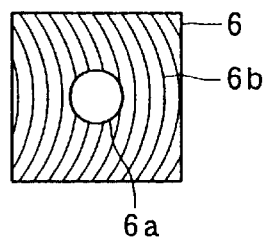
FIG. 2B
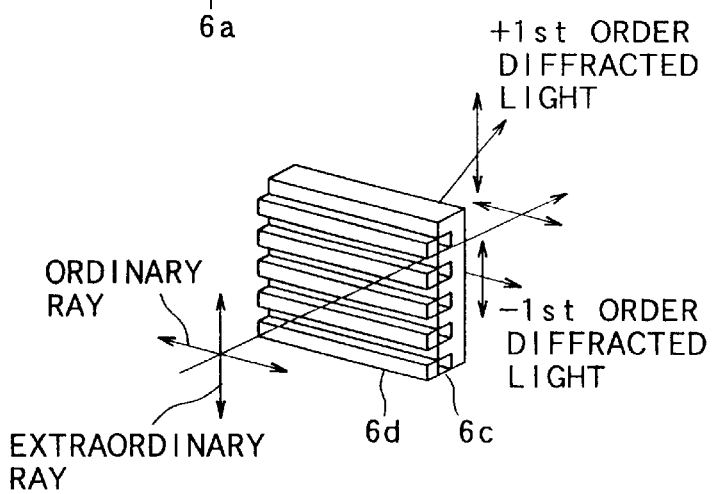
FIG. 2C
| POLARIZATION | SPATIAL PHASE CHANGE | EMITTED LIGHT |
|---|---|---|
| ORDINARY RAY | (phase change graph: dielectric film positive, proton exchange area negative, centered at 0) | NO DIFFRACTION |
| EXTRA-ORDINARY RAY | (phase change graph: dielectric film at π, proton exchange area at 0) | DIFFRACTED |

(MAGNIFIED)

POLARIZATION HOLOGRAM LENS, OPTICAL PICKUP, INFORMATION REPRODUCTION APPARATUS AND INFORMATION RECORDING APPARATUS

BACKGROUND OF THE INVENTION

1. Field of the Invention

The present invention relates to a polarization hologram lens for an optical pickup, the optical pickup, and an information reproduction apparatus or an information recording apparatus having the optical pickup, which are used for compatibly reproducing or recording information from or on optical discs having different substrate thicknesses or different recording densities.

2. Description of the Related Art

In recent years, as optical discs on which information is recorded, there has been developed various information storage media, such as DVD (Digital Video Disc or Digital Versatile Disc) and the like, whose recording density is improved compared with that of CD (Compact Disc) conventionally used. Therefore, the need for an information reproduction apparatus or an information recording apparatus capable of both reproducing and recording information from and on various kinds of optical discs is increased, and the optical pickup to be used in these apparatuses requires the compatibility in recording and reproduction for CD and DVD.

Incidentally, since the DVD has higher recording density than that of the CD and a thin substrate thickness, large numerical aperture is required. On the contrary, since the CD has a thick substrate thickness, its substantial numerical aperture must be small to avoid such a possibility that various servo signals and information signals are deteriorated. Therefore, in order to switch large numerical aperture and small numerical aperture without changing the arrangement of optical parts of the optical pickup, there has been proposed a technique utilizing a polarization hologram lens.

In one example of such technique, an optical pickup constituted such that a light beam passes through a polarization hologram lens, which is provided with a grating patterns on its outer circumference and a substantially circular aperture on its center portion, to enter an objective lens. In the optical pickup having such a configuration, an ordinary ray, for example, is not diffracted by the grating patterns and directly enters the objective lens. On the contrary, an extraordinary ray is diffracted by the grating patterns at the outer circumference of the hologram lens and only the ray passed through the aperture enters the objective lens, and hence a numerical aperture can be relatively smaller. Due to such a configuration, the numerical aperture can be switched to be small or large according to different substrate thicknesses, and thus it is possible to realize the optical pickup which can be compatibly used for optical discs having different recording densities or substrate thicknesses.

However, in order to realize the above conventional optical pickup which can be compatibly used, it is necessary to prevent the diffracted light, which was diffracted by the grating pattern provided on the outer circumference of the polarization hologram lens, from entering the objective lens because if the diffracted light is focused on the optical disc, its reflected light causes a deterioration of a detecting performance. For this reason, the polarization hologram lens and the objective lens should be arranged with a given necessary spacing there between. This necessarily makes the optical pickup be larger in size and also makes it difficult to miniaturize a movable portion of an actuator and to reduce its weight, thereby increasing a power consumption.

In addition, in order to avoid such a problem, an optical pickup can be constituted such that a grating pattern of a polarization hologram lens is blazed to suppress the generation of a −1st order diffracted light, thereby shortening the spacing between the polarization hologram lens and objective lens to a certain degree. However, when the grating pattern is blazed, the manufacture of the polarization hologram lenses becomes very difficult, and thus a great rise of the cost of the optical pickup cannot be avoided.

As mentioned above, there has been such a problem that it is difficult to provide the optical pickup, for a compatible use in information storage media having different recording densities and/or different substrate thicknesses, which has a miniaturized size, a reduced weight, a suppressed power consumption and a reduced cost.

SUMMARY OF THE INVENTION

The present invention has been achieved with such points in view, and an object is to provide an optical pickup which is miniaturized in size, light in weight and manufactured easily with low cost and which has lower power consumption.

Another object of the present invention is to provide an information reproduction apparatus and an information recording apparatus using the optical pickup, and to provide a polarization hologram lens for use as a component of the optical pickup.

According to one aspect of the present invention, there is provided a polarization hologram lens including: a first portion, positioned at a center of the hologram lens, on which no grating pattern is formed; and a second portion, positioned at an outer circumferential area of the first portion, on which grating patterns are formed, wherein the grating patterns do not diffract a light beam of a first polarization direction, and wherein the grating patterns diffract a light beam of a second polarization direction perpendicular to the first polarization direction to produce a diverging diffracted light or a converging diffracted light.

In accordance with the polarization hologram lens thus configured, when the light beam of the first polarization direction is supplied, it directly passes through both its first and second portions. On the other hand, when the light beam of the second polarization direction enters the polarization hologram lens, it directly passes therethrough at its first portion, but is diffracted by the grating patterns at the second portion. The light beam diffracted by the grating patterns becomes a diverging bundle of light beams or a converging bundle of light beams.

Therefore, the area through which the light beam passes is changed according to a polarization direction of the light beam entered the polarization hologram lens, and the diffracted light from the grating patterns is diverged or converged. For this reason, in the case where the objective lens is positioned at the backward stage, the diffracted light is not overlapped on the light beam which passed through the first portion and is not converged in a plane where the non-diffracted light beam is converged.

The grating patterns may include plural arc patterns produced from a part of concentric circular grating patterns defined around a center position which has a predetermined offset amount from the center of the concentric circular grating patterns.

With this arrangement, when the light beam of the first polarization direction enters the polarization hologram lens, it directly passes at the first and the second portions. On the contrary, when the light beam of the second polarization direction enters the polarization hologram lens, it directly passes at the first portion, but it is diffracted at the second portion by the arc patterns. Therefore, since the diffracted light due to the arc patterns of the polarization hologram lens are diverged or converged at the predetermined diffraction angle, if the objective lens is position at the backward stage, the diffracted lights have the focused points shifted from the focal point of the light beam passed through the first portion.

According to another aspect of the present invention, there is provided an optical pickup, including: the polarization hologram lens mentioned above; a light source for emitting a light beam; a polarization control unit for switching a polarization direction of the light beam to supply the light beam of one of the first polarization direction and the second polarization direction to the polarization hologram lens; an objective lens for converging the light beam passed through the polarization hologram lens to be incident on an information recording surface of an information storage medium; and a light receiving element for receiving a reflected component of the light beam reflected from the information recording surface, wherein a focus position of the diffracted light produced by the polarization hologram lens on the information recording surface is out of a range of a depth of focus with respect to the information recording surface.

According to the optical pickup thus configured, the light beam emitted from the light source is controlled by the polarization control unit by switching the polarization direction, and the light beam enters the polarization hologram lens. After the light beam passed through the polarization hologram lens enters the objective lens and is converged on the information recording surface, its reflected light is received by the light receiving element. At this time, the diffracted lights due to the polarization hologram lens are converged on a portion out of the range of the depth of focus with respect to the information recording surface of the information recording medium via the objective lens.

Therefore, since the area where the light beam directly passes through the polarization hologram lens can be changed according to the switching by the polarization control unit, the numerical aperture can be changed to be small or large according to the substrate thickness and the like. Moreover, even if the diffracted lights produced by the grating patterns are converged by the objective lens, they are in defocus state on the surface of the information recording medium, and thus an influence of the reflected light which exerts on the detecting performance is reduced. As a result, the polarization hologram lens and the objective lens can be arranged adjacently to each other, thereby enabling the miniaturization of the optical pickup.

Preferably, the grating patterns may be formed so that the reflected component of the diffracted light reflected by the information recording surface does not enter the objective lens. By this, the light beam emitted from the light source is converged on the information recording medium, but when the diffracted lights produced by the polarization hologram lens are reflected by the information recording medium, they are not returned back to the objective lens, and thus their reflected lights are not received by the light receiving element. As a result, the detecting performance is not deteriorated by the influence of the diffracted light which is not originally required.

According to still another aspect of the present invention, there is provided an information reproduction apparatus for reproducing information recorded on at least two kinds of information storage media having different substrate thicknesses or different recording densities, including the optical pickup mentioned above, wherein the polarization control unit supplies the light beam of the first polarization direction to the polarization hologram lens when an information storage medium having a thin thickness substrate or a high recording density is used, and supplies the light beam of the second polarization direction to the polarization hologram lens when an information storage medium having a thick substrate thickness or a low recording density is used.

In accordance with the information reproduction apparatus thus configured, when the reproduction from an information recording medium having a thin substrate thickness or high recording density such as DVD is executed, the polarization control unit makes a control so that the light beam of the first polarization direction enters the polarization hologram lens and it is converged on the information recording medium via the polarization hologram lens with a high numerical aperture. On the other hand, when reproduction from an information recording medium having a thick substrate thickness or a low recording density such as CD is executed, the polarization control unit makes a control so that the light beam of the second polarization direction enters the polarization hologram lens and it is converged on the information recording medium via the polarization hologram lens with a relatively low numerical aperture.

Therefore, a unique information reproduction apparatus can be used for two kinds of the information storage media having different substrate thicknesses and recording densities by switching, and the optical pickup to be used for this can change the numerical aperture easily according to the type of the information storage media. Moreover, since the optical pickup is small and light, an increase in the consumption power due to the enlargement of the movable portion can be avoided.

According to still another aspect of the present invention, there is provided an information recording apparatus for recording information on at least two kinds of information storage media having different substrate thicknesses or different recording densities, including the optical pickup mentioned above, wherein the polarization control unit supplies the light beam of the first polarization direction to the polarization hologram lens when an information storage medium having a thin thickness substrate or a high recording density is used, and supplies the light beam of the second polarization direction to the polarization hologram lens when an information storage medium having a thick substrate thickness or a low recording density is used.

In accordance with the information recording apparatus thus configured, when information is recorded on an information recording medium having a thin substrate thickness or high recording density such as DVD, the polarization control unit makes a control so that the light beam of the first polarization direction enters the polarization hologram lens and it is converged on the information recording medium via the polarization hologram lens with a large numerical aperture. On the other hand, when information is recorded on an information recording medium having a thick substrate thickness or a low recording density such as CD, the polarization control unit makes a control so that the light beam of the second polarization direction enters the polarization hologram lens and it is converged on the information recording medium via the polarization hologram lens with a relatively small numerical aperture. At this time, the diffracted lights produced by the polarization hologram lens are in the defocus state on the information recording medium, and since the intensity of the light can be weakened, an error in recording by the phase change recording technique, for example, may be avoided.

Therefore, a unique information recording apparatus can be used commonly for two kinds of the information storage media having different substrate thicknesses and recording densities by switching, and the optical pickup to be used for this can change the numerical aperture easily according to the information storage media. Moreover, since the optical pickup is small and light, an increase in the consumption power due to the enlargement of the movable portion can be avoided.

According to still another aspect of the present invention, there is provided a polarization hologram lens for use in an optical pickup, including: a circular central portion for passing a light beam of both first polarization direction and a second polarization direction perpendicular to the first polarization direction without diffraction; and an outer portion surrounding the circular central portion for passing the light beam of the first polarization direction without diffraction and passing the light beam of the second polarization direction with diffraction to produce diffracted light beams.

The outer portion may include a plurality of arc-shaped grating patterns aligned with each other, and the arc-shaped grating patterns may be produced as a part of plurality of grating patterns in a form of concentric circles.

According to still another aspect of the present invention, there is provided an optical pickup including: a light beam producing unit for producing a light beam of a first polarization direction and a light beam of a second polarization direction; a switching unit for outputting the light beam of one of the first and the second polarization directions; and a lens system, including a polarization hologram lens and an objective lens, for converging the light beam outputted by the switching unit on an information recording surface of an information storage medium, wherein the lens system converges the light beam of the first polarization direction on the information recording surface in a focused manner with a first numerical aperture, and wherein the lens system converges the light beam of the second polarization direction in a focused manner with a second numerical aperture smaller than the first numerical aperture.

The lens system may diffract a part of the light beam of the second polarization direction to produce a diffracted light and converges the diffracted light on the information recording surface in a defocused manner. In a preferred embodiment, the light beam producing unit may include a light source for emitting a light beam, and a polarization unit for polarizing the light beam from the light beam source to selectively produce the light beam of one of the first polarization direction and the second polarization direction. Alternatively, the light beam producing unit may include a first light source for emitting the light beam of the first polarization direction and the second light source for emitting the light beam of the second polarization direction.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 2A and 2B are configurational diagrams of a polarization hologram lens according to the embodiment of the present invention, wherein FIG. 2A is a front view and FIG. 2B is a configurational view of a section of a hologram area.

FIG. 2C is a diagram for explaining a phase change due to the hologram area.

FIGS. 6A and 6B are diagrams for explaining design conditions of the polarization hologram lens for a diffracted light according to the embodiment of the present invention, wherein FIG. 6A is a diagram showing the design condition of a defocus amount and FIG. 6B is a diagram showing a design condition of an offset amount of a focusing point.

DETAILED DESCRIPTION OF THE PREFERRED EMBODIMENTS

There will be described below preferred embodiments of the present invention with reference to the drawings. Here, the following description will refer to the case that the present invention is applied to an optical pickup mounted to an information reproduction apparatus capable of reproducing information from both CD and DVD, serving as information storage media.

Figure 1:
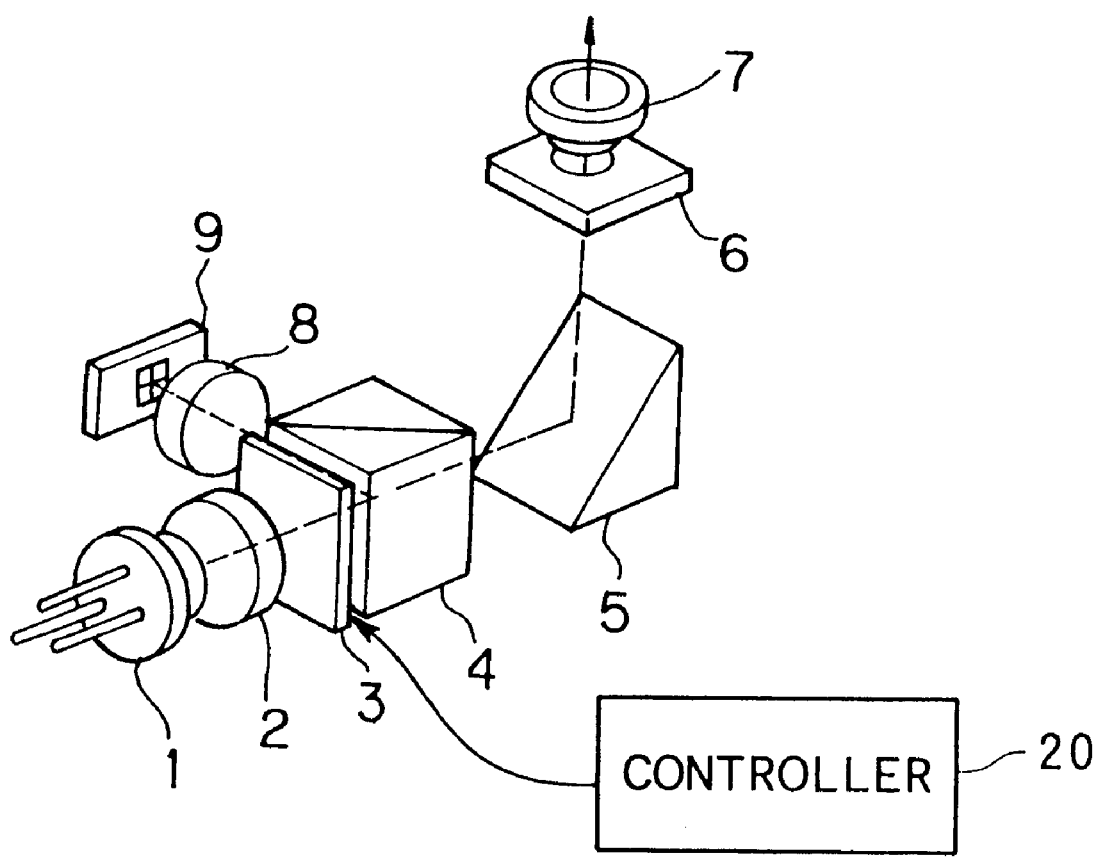
FIG. 1 is a perspective view showing a schematic configuration of an optical pickup according to an embodiment of the present invention.

FIG. 1 is a diagram showing a schematic configuration of an optical pickup according to the first embodiment. The optical pickup shown in FIG. 1 has a semiconductor laser 1, a collimating lens 2, a liquid crystal panel 3, a beam splitter 4, a reflecting mirror 5, a polarization hologram lens 6, an objective lens 7, a detecting lens 8 and a light receiving element 9. Here, the respective optical systems of the optical pickup shown in FIG. 1 are basically designed such that reproduction from DVD can be executed in an optimum manner.

In the configuration shown in FIG. 1, a light beam is emitted from the semiconductor laser 1. The wavelength of this light beam may be 650 nm, for example. After the light beam is changed into a parallel light by the collimating lens 2, the parallel light passes through the liquid crystal panel 3. This liquid crystal panel 3 controls a polarization direction of the light beam utilizing a birefringence effect of liquid crystal molecules, and a predetermined voltage is applied to the liquid crystal panel 3 by a controller 20 so that the polarization direction can be changed. In the present embodiment, the liquid crystal display 3 controls the polarization direction of the incident light beam such that an extraordinary ray is supplied to the polarization hologram lens 6, via the intervening optical elements, when operating CD and an ordinary ray, perpendicular to the extraordinary ray, is supplied to the polarization hologram lens 6, via the intervening optical elements, when operating DVD.

The light beam having the constant polarization direction, which passed through the liquid crystal panel 3, passes through the beam splitter 4 and is reflected by the reflecting mirror 5 so as to enter the polarization hologram lens 6. In the polarization hologram lens 6, the light beam of the polarization direction for the DVD operation is not diffracted, and the light beam of the polarization direction for the CD operation is diffracted by hologram patterns provided at an outer circumference of the hologram lens. The mechanism of the diffraction in the polarization hologram lens 6 will be detailed later.

The light beam, which entered the objective lens 7 via the polarization hologram lens 6, is converged on information recording surface of the optical discs not shown, with a large numerical aperture at the time of the DVD operation and with a small numerical aperture at the time of the CD operation. Importantly, the optical pickup of the present embodiment can be constituted so that the lights diffracted by the polarization hologram lens 6 may enter the objective lens 7. This is because the diffracted lights are converged on the information recording surface of the optical disc in a defocused state due to the diffracting function of the polarization hologram lens 6, and its detailed mechanism will be described later. As a result, the polarization hologram lens 6 and the objective lens 7 can be arranged adjacently to each other, thereby enabling the downsizing of the pickup.

Next, the structure of the polarization hologram lens 6 according to the present embodiment will be described with reference to FIGS. 2A to 2C.

FIG. 2A is a front view of the polarization hologram lens 6. The polarization hologram lens 6 shown in FIG. 2A is wholly made of lithium niobate which shows a birefringence property. A circular non-hologram area 6a having a predetermined size, on which hologram patterns are not formed, is formed at the central portion of the hologram lens 6, and a hologram area 6b, on which a hologram pattern with a predetermined shape serving as a diffraction grating, is formed at the outer circumference of the hologram lens 6.

Here, the predetermined size of the circular shape of the non-hologram area 6a means such a size that a numerical aperture of an incident light entering the objective lens 7 at the time of executing reproduction from the CD becomes optimum for the reproduction from the CD. Namely, the size corresponds to a numerical aperture of CD.

FIG. 2B is a diagram showing a sectional configuration of the hologram area 6b of the polarization hologram lens 6. In the hologram area 6b shown in FIG. 2B, convexoconcave hologram patterns are arranged continuously and repeatedly on the lithium niobate substrate with a predetermined pitch, and a dual-layered structure which is composed of a proton exchange area 6c and a dielectric film 6d is formed on its convex portions. The arrangement is made so that an ordinary ray is along a direction of the hologram patterns with respect to an optical axis, and an extraordinary ray is along a direction perpendicular to the hologram patterns. As a result, the ordinary ray is not diffracted and directly passes through the hologram area 6b, whereas the extraordinary ray is diffracted and a +1st order diffracted light and −1st order diffracted light are produced with predetermined diffraction angles.

Namely, as shown in FIG. 2C, a refractive index of the proton exchange area 6c with respect to the ordinary ray is reduced, and a phase change thereby is canceled by a phase change resulted by the dielectric film 6d. As a result, no spatial phase change of the ordinary ray is caused by the hologram patterns. For this reason, the ordinary ray is not diffracted by the hologram patterns. On the contrary, a refractive index of the proton exchange area 6c with respect to the extraordinary ray is increased, and a phase change thereby and a phase change by the dielectric film 6d are superposed to result a total phase change of π. This phase change is spatially repeated on the hologram patterns. For this reason, as for the extraordinary ray, the hologram patterns serve as the diffraction grating.

Next, a principle of the diffraction by the polarization hologram lens 6 according to the present embodiment will be described with reference to FIG. 3.

Figure 3:
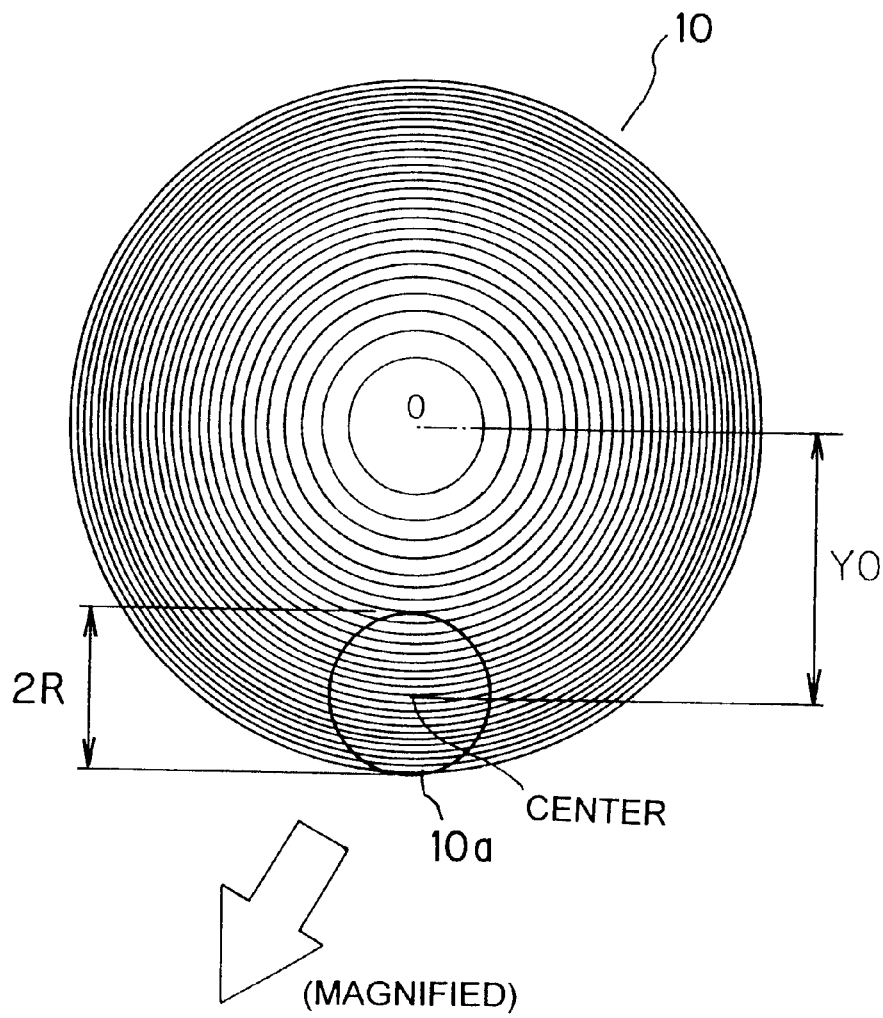
FIG. 3 is a diagram for explaining a principle of diffraction by the polarization hologram lens according to the embodiment of the present invention.
Figure 3:
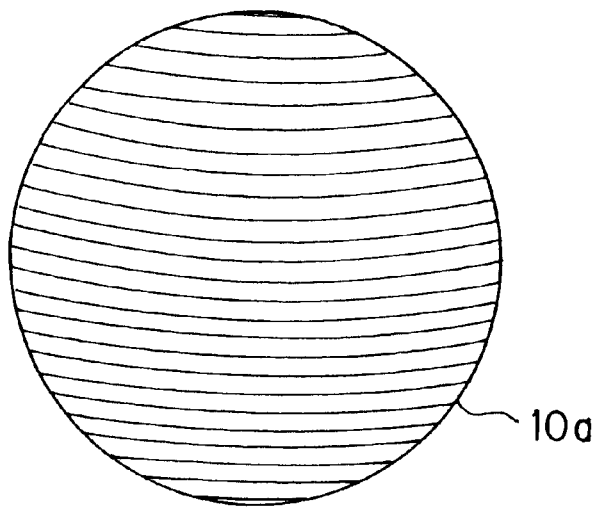

As shown in FIG. 3, the hologram patterns of the polarization hologram lens 6 according to the present embodiment is created by cutting out a circular portion 10a of a Fresnel lens 10 which is produced by overlapping multiple ring-shaped concentric circular patterns. The concentric circular patterns formed on the Fresnel lens 10 have the pitches getting narrower from the center towards outer peripheral portions. Therefore, when a light beam enters the Fresnel lens 10, the Fresnel lens 10a functions as a lens for diffracted lights.

The pattern of the circular portion 10a having a radius R and a center offset by Y0 from a center of the Fresnel lens 10 may be cut out and used as the hologram patterns of the hologram area 6b. As shown in the lower part of FIG. 3 in the enlarged view, a plurality of arc patterns are arranged on the circular portion 10a. By eliminating the hologram patterns from the central portion the circular portion 10a to form the non-hologram area 6a, the polarization hologram lens 6 is produced.

In the preferred embodiment, Y0=4.04 mm and R=0.9 mm. The pitch of the grating patterns of the circular portion 10a falls within a range of 90.1 $\mu$m to 58.8 $\mu$m.

Figure 4:
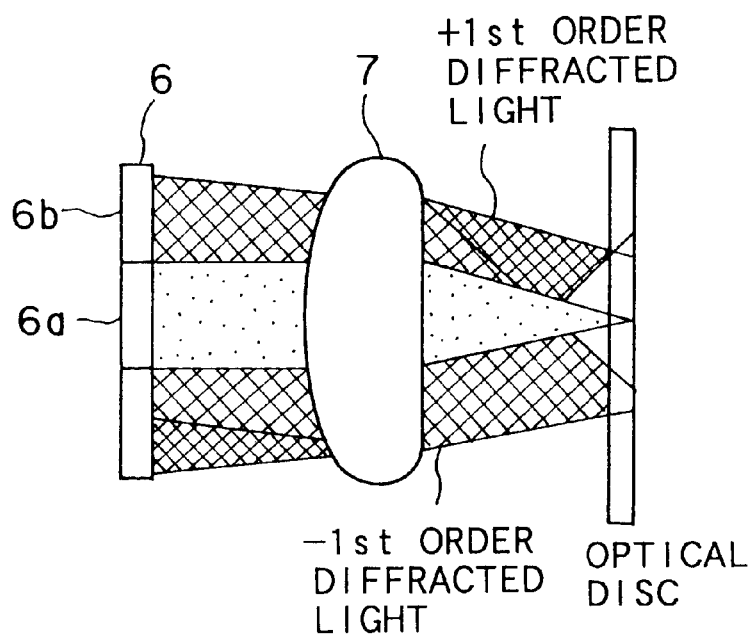
FIG. 4 is a diagram for explaining a diffracting function for an optical beam passing through the polarization hologram lens according to the embodiment of the present invention.

Next, the diffracting function by means of the polarization hologram lens 6 will be described with reference to FIG. 4. When an extraordinary ray enters the polarization hologram lens 6 formed as mentioned above, it travels straight to enter the objective lens 7 within the non-hologram area 6a at the central portion. Further, as mentioned above, an extraordinary ray is diffracted by the hologram patterns in the hologram area 6b at the outer circumferential portion, and as a result a +1st order diffracted light and −1st order diffracted light are created. Since the offset Y0 (see. FIG. 3) is given to the hologram patterns, the +1st order diffracted light enters the objective lens 7 with slightly converging. On the contrary, the −1st order diffracted light enters the objective lens 7 with slightly diverging. As a result, both the +1st order diffracted light and −1 diffracted light are irradiated on the information recording surface of the optical disc, via the objective lens 7, in a defocus state at the positions which are shifted from the original and correct focusing position of the light beam.

If the offset Y0 is not given, the +1st order diffracted light and −1 diffracted light are converged on the optical axis. Namely, the +1st order diffracted light is converged at a point on the optical axis nearer than the information recording surface, and the −1st order diffracted light is converged at a point on the optical axis farther than the information recording surface. Therefore, the reflected light including the reflected components of those diffracted lights is returned onto the light receiving element 9 nearly completely, and this cause an error in detection.

Figure 5:
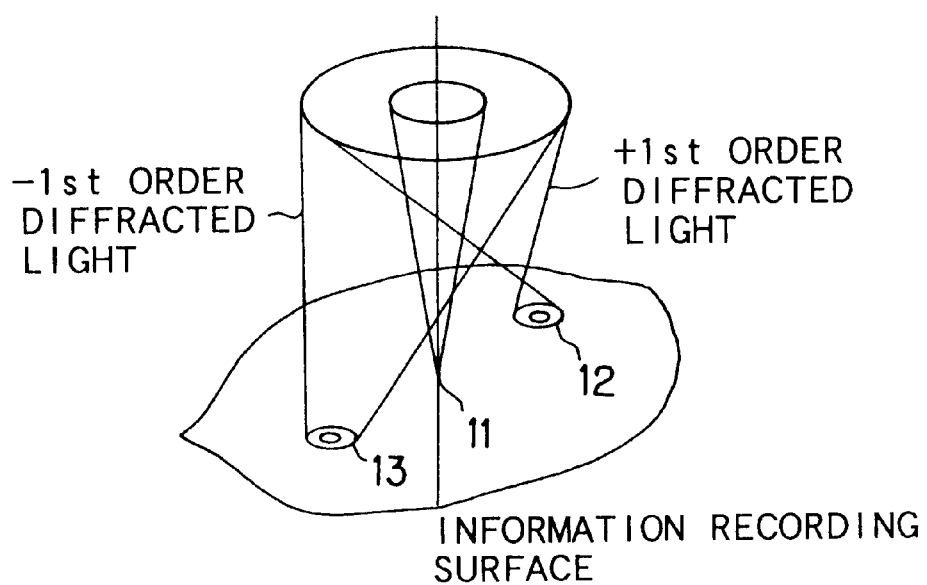
FIG. 5 is a diagram for explaining a light focusing state on an information recording surface of an optical disc.

FIG. 5 shows the incident state of the light beams on the information recording surface of the optical disc. As shown in FIG. 5, the light beam, which passed through the non-hologram area 6a of the polarization hologram lens 6, is incident on the surface to form an in-focus beam spot 11 thereon. On the contrary, out of the lights diffracted by the hologram area 6b of the polarization hologram lens 6, the +1st order diffracted light is incident on the surface to form a beam spot 12 while the −1st order diffracted light is incident on the surface to form a beam spot 13. Thus, the beam spots 12 and 13 are arranged on a substantially straight line in a fashion sandwiching the beam spot 11 with given intervals therebetween.

The beam spot 11 is in focus, and a light reflected by pits on the information recording surface can be read out appropriately and correctly. On the contrary, the in-focus point of the beam spot 12 is nearer than the information recording surface and the in-focus point of the beam spot 13 is farther than the information recording surface. Namely, both of them are in the defocus state. As a result, the intensities of the light beam at the beam spots 12 and 13 are weaker than that on the in-focus beam spot 11.

The hologram patterns of the polarization hologram lens 6 are preferably determined such that the lights reflected from the beam spots 12 and 13 do not enter the objective lens 7. However, even if the light reflected from the beam spots 12 and 13 enter the objective lens 7, this does not cause an error in detection because, as for the light receiving amount by the light receiving element 9, the modulation amount of the reflected lights passed through the hologram area 9b are greatly lower than the modulation amount of the reflected light of the light beam passed through the non-hologram area 9a.

Next, the design conditions of a defocus amount required for the diffracted lights and an offset amount of the focusing points of the diffracted lights will be described with reference to FIGS. 6A and 6B. Here, the following description will refer to the case where the hologram area 6b of the polarization hologram lens 6 is produced, as mentioned above, from the circular portion 10a of the hologram patterns on the Fresnel lens 10 serving as the diffraction grating.

Figure 6A:
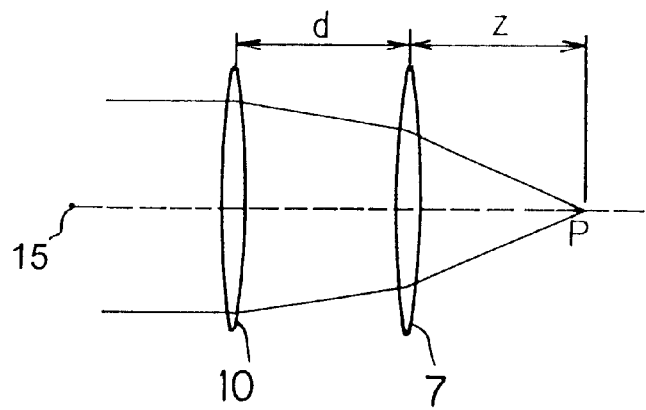

FIG. 6A shows a virtual positional relationship between the Fresnel lens 10 and the objective lens 7 for obtaining the design condition of the defocus amount. In FIG. 6A, it is assumed that the centers of the Fresnel lens 10 and objective lens 7 coincide with the optical axis 15. The focal length of the Fresnel lens 10 is f, the focal length of the objective lens 7 is f0, the distance between the Fresnel lens 10 and objective lens 7 is d, and the distance between the objective lens 7 and the light converging point P is Z. Here, Z satisfies the following relationship:

$$Z=(f0 \times d \pm f0 \times f)/(d \pm f - f0) \quad (1)$$

Here, in the formula (1), +f is a focal length due to +1st order light, and −f is a focal length due to −1st order light.

On the other hand, since the converging point without the hologram patterns satisfies Z=f0, an axial displacement of the converging point P satisfies the following relationship:

$$P=Z-f0=(f0 \times f0)/(d \pm f - f0) \quad (2)$$

If this value P is larger than a depth of focus of the objective lens 7 with respect to the optical disc, the beam spots 12 and 13 on the information recording surface are brought into the defocus state. Therefore, the value of the formula (2) represents the defocus amount required for the diffracted lights.

For example, if the calculation is made on the assumption that f0=3.3 mm, d=5 mm, and the depth of focus of the pickup with small aperture such as CD is ±1 μm, the result indicates that f may be no more than 10890 mm, and the design can be made based on the Fresnel lens 10 having a very long focal length.

Figure 6B:
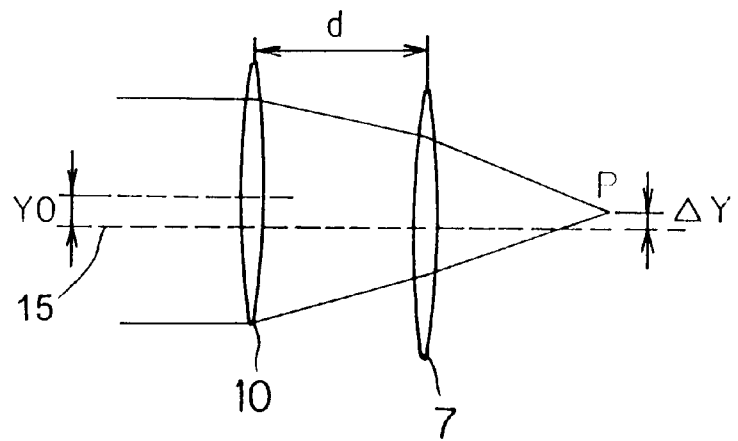

FIG. 6B shows a virtual positional relationship between the Fresnel lens 10 and objective lens 7 for obtaining the offset amount of the converging point. In FIG. 6B, the center of the Fresnel lens 10 is offset by Y0 from the optical axis 15 passing through the center of the objective lens 7, and the converging point P is offset by ΔY from the optical axis 15. At this time, ΔY satisfies the following relationship:

$$\Delta Y=\{f0+(f-d)\}/(f-d)2 \times f0 \quad (3)$$

Namely, it is found from ΔY shown in the formula (3) and the property of the objective lens 7 whether or not the lights reflected from the information recording surface of the optical disc return to the objective lens 7. Therefore, the value of the formula (3) represents the required offset amount ΔY of the converging points for the diffracted lights.

While it is preferred that the optical systems are designed such that the reflected lights of the diffracted lights do not return to the objective lens 7, even if the design is made such that the reflected diffracted lights return to the objective lens 7, the diffracted lights are converged in the defocus state as mentioned above, and hence the effect of the present invention be ensured.

When the optical systems of the optical pickup are designed according to the above-mentioned design conditions, a single optical pickup can be compatibly used for CD and DVD, for example. Namely, the liquid crystal panel 3 supplies an ordinary ray to the polarization hologram lens 6 for DVD operation and the ordinary ray is not diffracted by the hologram area 6b. Therefore, the light beam wholly passes through the objective lens 7 and is converged on the information recording surface of the DVD via the object lens 7 with the large numerical aperture.

On the other hand, the liquid crystal panel 3 supplies an extraordinary ray to the polarization hologram lens 6 and the extraordinary ray is diffracted by the hologram area 6b. Therefore, the light beam passes only through the non-hologram area 6a at the center, and a +1st order diffracted light and −1st order diffracted light are created, by diffraction, in the hologram area 6b at the outer circumferential portion of the hologram lens 6. Accordingly, the light beam passes through the objective lens 7 and is converged on the information recording surface of the CD with the small numerical aperture is small, and the diffracted lights are incident on the surface in the defocus state as shown in FIG. 5.

The above-mentioned embodiment referred to the case where the ordinary ray is not diffracted and the extraordinary ray is diffracted based on the birefringence property of the polarization hologram lens 6. However, the present invention is applicable to the configuration that, out of two rays having polarization directions intersecting perpendicularly to each other, one ray is diffracted and the other ray is not diffracted.

Further, the above-mentioned embodiment referred to such configuration that only one semiconductor laser 1 is employed and one wavelength is commonly used for at least two kinds of information storage media. However, a semiconductor laser 1 which can emit at least two wavelengths may be used.

Furthermore, while the above description was given as to the case that a portion of the concentric circular patterns of the Fresnel lens 10 is used as the hologram patterns of the polarization hologram lens 6, the present invention is not limited to this feature. The hologram patterns may be grating patterns for converging the diffracted lights in the defocus state. For example, the hologram patterns may include a plurality of parallel straight, linear patterns by setting the curvature of the circular portion 10a of the Fresnel lens 3 in FIG. 3 is 0. In this case, since the pitches of the straight lines are reduced gradually, the +1st order diffracted light and −1st order diffracted light are converged, via the objective lens, at the positions nearer or farther from the converging point of a 0th-order diffracted light, on the same line in the defocus state.

Still further, while the above embodiment described the case where the sectional structure of the hologram area 6b of the polarization hologram lens 6 has the convexoconcave shape, the hologram area 6b may have a blazed sectional structure. This makes the manufacturing difficult, but the −1st order diffracted light is not produced, and thus the design may be made considering only the performance of +1st order diffracted light. This facilitates the miniaturization of the optical pickup. Also in this case, if the +1st order diffracted light is brought into the defocus state, remarkable effect of the application of the present invention is ensured.

Figure 7:
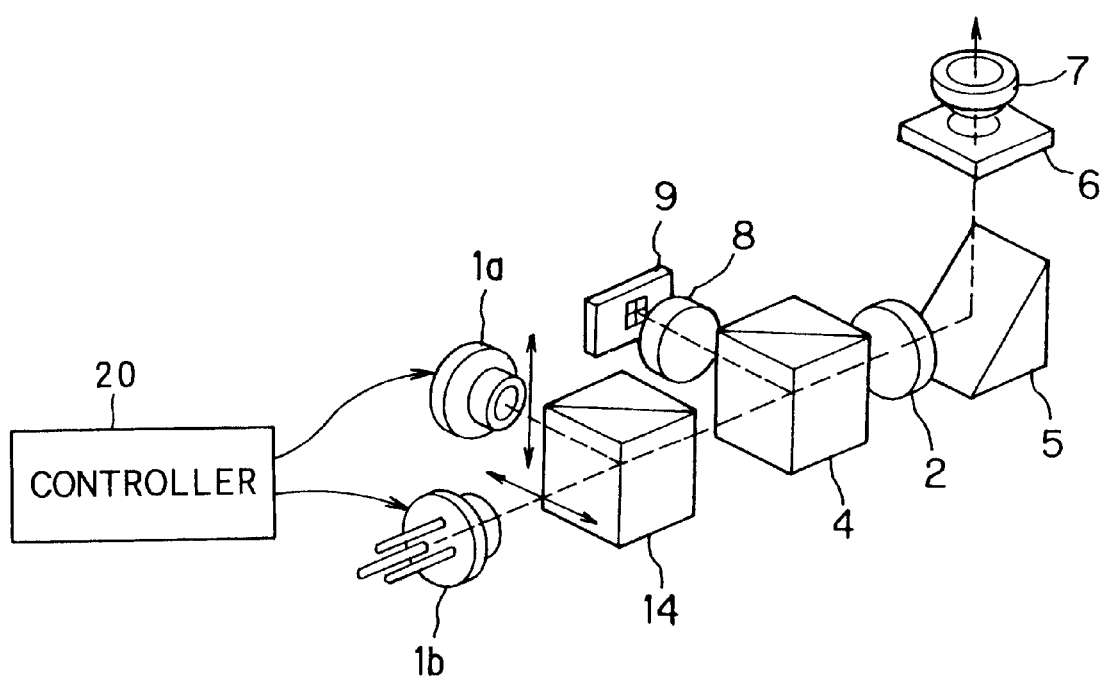
FIG. 7 is a block diagram showing a schematic configuration of another embodiment of the optical pickup according to the present invention.

Next, another embodiment of the optical pickup according to the present invention will be described with reference to FIG. 7. FIG. 7 is a diagram showing a schematic structure of the optical pickup employing two semiconductor lasers.

The optical pickup shown in FIG. 7 has a first semiconductor laser 1a for emitting a light beam to a recording medium with a thick substrate thickness such as CD and CD-R (CD-recordable), a second semiconductor laser 1b for emitting a light beam to a recording medium with a thin substrate thickness such as DVD, a polarization beam splitter 14, the beam splitter 4, the collimating lens 2, the reflecting mirror 5, the polarization hologram lens 6, the objective lens 7, the detecting lens 8 and the light receiving element 9.

In the configuration shown in FIG. 7, a light beam emitted from the first semiconductor laser 1a passes through the polarization beam splitter 14 having a birefringence property and enters, as an extraordinary ray, the polarization hologram lens 6 via the beam splitter 4, the collimating lens 2 and the reflecting mirror 5. On the contrary, the light beam emitted from the second semiconductor laser 1b has its polarization direction shifted by an angle of 90° with respect to the light beam from the first semiconductor laser 1a, and enters the polarization hologram lens 6 as the light beam of an ordinary ray.

Here, since the polarization hologram lens 6 has the same structure as that in the first embodiment, the light beam emitted from the semiconductor laser 1a is diffracted by the hologram area 6b and is converged on the information recording surface of the optical disc with a small numerical aperture. On the contrary, the light beam emitted from the semiconductor laser 1b is not diffracted by the hologram area 6b and is converged on the information recording surface of the optical disc with a large numerical aperture. Therefore, both the DVD whose recording density is high and substrate thickness is thin and the CD whose recording density is low and substrate thickness is thick can be operated by switching the semiconductor lasers 1a and 1b for emitting light beams.

In addition, the embodiment shown in FIG. 7 is particularly advantageous in the case where the wavelengths of the lights from the semiconductor lasers 1a and 1b are different. For example, this can be applied to the optical pickup compatible with both the CD-R and DVD. Since the CD-R uses a pigment for the recording and reproduction, its wavelength dependence is strong, and the recording and reproduction can be executed only with a wavelength of 780 nm. Therefore, two light sources are required for the optical pickup which can be used commonly for both the CD-R and DVD. In that case, the wavelength of the first semiconductor laser 1a is set to 780 nm, and the wavelength of the second semiconductor laser 1b is set to 650 nm.

Further, in the case where a blue laser with a shorter wavelength is adopted in order to cope with next-generation DVD with high recording density, since a DVD dual-layered disc of a current system does not reflect the blue laser, it is difficult to use a single semiconductor laser in common. In that case, if the configuration of FIG. 7 is used, the semiconductor lasers having different wavelengths are used in a switched manner, and thus the compatibility can be ensured.

Here, a normal beam splitter may be used instead of the polarization beam splitter 14, and the liquid crystal panel 3 may be arranged similarly to the configuration of FIG. 1. Also in this case, the present invention can be applied similarly to FIG. 7, and thus two semiconductor lasers having different wavelengths are switched so as to enable the common use.

When the optical pickup of the above described embodiments is employed in an information reproduction apparatus which can be used commonly for both CD and DVD so as to be operated, at first the type of the information recording medium from which an information should be reproduced is discriminated. When the reproduction from the DVD is executed, an appropriate voltage is applied to the liquid crystal panel 3 by the controller 20 so that the polarization direction of the light beam becomes a direction of an ordinary ray, or a control is made so that the semiconductor laser 1a is turned off and the semiconductor laser 1b is turned on. On the other hand, when the reproduction from the CD is executed, an appropriate voltage is applied to the liquid crystal panel 3 by the controller 20 so that the polarization direction of a light beam becomes a direction of an extraordinary ray, or a control is made so that the semiconductor laser 1a is turned on and the semiconductor laser 1b is turned off.

Here, if the optical pickup of the present embodiment is employed in an information recording apparatus which can be used commonly for both CD and DVD so as to be operated, the control which is the same as in the above information reproduction apparatus is made. At this time, the +1st order diffracted light and −1st order diffracted light, which were diffracted by the polarization hologram lens 6 at the time of operating the CD, are emitted to the optical disc with the +1st order diffracted light in a converging state and the −1st order diffracted light in a diverging state. However, both the diffracted lights are in the defocus state, and an adverse effect of reflected lights thereof is avoided.

As mentioned above, since the optical pickup of the present embodiment makes a control so that the ordinary ray enters the polarization hologram lens 6 in the case of the information recording medium such as DVD with a thin disc thickness, the light beam is not diffracted by the polarization hologram lens 6 and directly passes therethrough so as to enter the objective lens 7. As a result, the light beam is converged on the information recording surface of the optical disc with a large numerical aperture.

On the contrary, the optical pickup makes a control so that the extraordinary ray enters the polarization hologram lens 6 in the case of the information recording medium such as CD with a thick disc thickness. Therefore, the light beam directly passes through the non-hologram area 6a at the center portion but is diffracted by the portion of the hologram patterns where the Fresnel lens 10 or the like functions in the hologram area 6 at its circumferential portion. While the diffracted lights are diverged or converged, the diffracted lights are irradiated on the optical disc via the objective lens 7 in the defocus state. Therefore, the numerical aperture can be small, and the adverse effect of the reflected diffracted lights is avoided.

In addition, the optical pickup of the present embodiment can be miniaturized and its weight can be reduced because the polarization hologram lens 6 and objective lens 7 can be arranged adjacently to each other while ensuring the common use for both different optical discs such as CD and DVD as mentioned above. Therefore, the power consumption required for a movable portion such as an actuator in the information reproduction apparatus can also be reduced.

Here, the present embodiment mainly referred to the case where the present invention is applied to the optical pickup which can be commonly used for both CD whose recording density is low and substrate thickness is thick and DVD whose recording density is high and substrate thickness is thin, but the present invention is not limited to this feature. Namely, the present invention can be applied to at least two types of information storage media with different recording densities, and when the recording densities are different, the present invention is applicable even if substrate thickness are the same. One example of this is an optical pickup which can be used in common for both MUSE-LD and normal LD.

As described above, according to one aspect of the present invention, since the extraordinary ray is diverged or converged by the polarization hologram lens at the outer circumferential portion provided with the grating patterns, if the objective lens is positioned at the backward stage, the extraordinary ray is not converged in a converging plane of a main beam. As a result, the components of the optical pickup capable of using in common for information storage media with different substrate thicknesses can be provided.

According to another aspect of the present invention, the +1st order diffracted light is converged and the −1st order diffracted light is diverged at a predetermined diffracting angle by the diffracting function due to the arc patterns in a predetermined range offset from the center of the concentric circular grating patterns. For this reason, if the objective lens is positioned at the backward stage, the diffracted lights are emitted with a predetermined distance from each other in the converging plane of the main beam so that the converging position is forward or backward. As a result, the components of the optical pickup capable of being used in common for information storage media having different substrate thicknesses can be provided, and its design can be made easily.

According to still another aspect of the present invention, the polarization direction of the light beam is controlled by switching, and one of the ordinary ray and extraordinary ray enters the polarization hologram lens, and its diffracted lights are converged via the objective lens on a portion out of the range of the depth of focus of the information storage media. Therefore, the numerical aperture can be set to be small or large according to the substrate thickness and the like and the diffracted lights are emitted to the information storage media in the defocus state, and thus the influence of the reflected lights which exerts on the detecting performance is reduced. As a result, the polarization hologram lens and the objective lens can be arranged adjacently to each other, and it is possible to provide the optical pickup which can be used in common for the information storage media with different substrate thicknesses and can be miniaturized and light and manufactured with low cost.

According to still another aspect of the present invention, after the diffracted lights from the polarization hologram lens are reflected by the information storage medium, they are not returned to the objective lens. For this reason, in addition to that the diffracted lights are in the defocus state on the information storage medium, a deterioration in the detecting performance due to the originally unnecessary influence of the diffracted lights can be eliminated. As a result, it is possible to provide an optical pickup which can be used in common for the information storage media with different substrate thicknesses and can be miniaturized and light and has a low cost and more excellent detecting performance.

According to still another aspect of the present invention, in the information reproduction apparatus, since the numerical aperture can be changed to be small or large according to the substrate thickness and the recording density of the information storage media such as DVD and CD, two types of the information storage media are switched to be capable of being used in one information reproduction apparatus. Moreover, the numerical aperture of the optical pickup can be easily controlled and the optical pickup can be miniaturized and its weight is reduced. For this reason, an increase in the consumption power due to enlargement of the movable portion can be avoided. As a result, it is possible to provide an information reproduction apparatus which can be used in common for the information storage media with different substrate thicknesses and is miniaturized and has the low power consumption.

According to still another aspect of the present invention, in the information recording apparatus, since the numerical aperture can be changed to be small or large according to the substrate thickness and the recording density of the information storage media such as DVD and CD, two types of the information storage media are switched to be capable of being used in one information reproduction apparatus. Moreover, the numerical aperture of the optical pickup can be easily controlled and the optical pickup can be miniaturized and its weight is reduced. For this reason, an increase in the consumption power due to enlargement of the movable portion can be avoided. As a result, it is possible to provide an information reproduction apparatus which can be used in common for the information storage media with different substrate thicknesses and is miniaturized and has the low dissipation power.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No.10-072796 filed on Mar. 20, 1998 including the specification, claims, drawings and summary is incorporated herein by reference in its entirety.

What is claimed is:

1. A polarization hologram lens comprising:
  a first portion, positioned at a center of said holograms lens, on which no grating pattern is formed; and
  a second portion, positioned at an outer circumferential area of the first portion, on which concentric circular grating patterns are formed, wherein the concentric circular grating patterns do not diffract a light beam of a first polarization direction, and wherein the concentric circular grating patterns diffract a light beam of a second polarization direction perpendicular to the first polarization direction to produce a diverging diffracted light or a converging diffracted light, wherein the concentric circular grating patterns comprise plural arc patterns produced from a portion of concentric circular patterns defined around a center position, the portion being offset a predetermined amount from a center of the concentric circular patterns, wherein the second portion produces ±1$^{st}$ order diffracted lights which are incident upon an information recording surface of an information storage medium in a defocused state.

2. A polarization hologram lens according to claim 1, wherein the second portion comprises a dual-layered structure comprising proton exchange areas and dielectric films.

3. An optical pickup, comprising:
a polarization hologram lens comprising:
a first portion, positioned at a center of said holograms lens, on which no grating pattern is formed; and
a second portion, positioned at an outer circumferential area of the first portion, on which concentric circular grating patterns are formed, wherein the concentric circular grating patterns do not diffract a light beam of a first polarization direction, and wherein the concentric circular grating patterns diffract a light beam of a second polarization direction perpendicular to the first polarization direction to produce a diverging diffracted light or a converging diffracted light, wherein the concentric circular grating patterns comprise plural arc patterns produced from a portion of concentric circular patterns defined around a center position, the portion being offset a predetermined amount from a center of the concentric circular patterns;
a light source for emitting a light beam;
a polarization control unit for switching a polarization direction of the light beam to supply the light beam of one of the first polarization direction and the second polarization direction to the polarization hologram lens;
an objective lens for converging the light beam passed through the polarization hologram lens to be incident on an information recording surface of an information storage medium; and
a light receiving element for receiving a reflected component of the light beam reflected from the information recording surface,
wherein a focus position of the diffracted light produced by the polarization hologram lens on the information recording surface is out of a range of a depth of focus with respect to the information recording surface.

4. The optical pickup according to claim 3, wherein the grating patterns are formed so that the reflected component of the diffracted light reflected by the information recording surface does not enter the objective lens.

5. An information reproduction apparatus for reproducing information recorded on at least two kinds of information storage media having different substrate thicknesses or different recording densities, comprising the optical pickup according to claim 3, wherein the polarization control unit supplies the light beam of the first polarization direction to the polarization hologram lens when an information storage medium having a thin thickness substrate or a high recording density is used, and supplies the light beam of the second polarization direction to the polarization hologram lens when an information storage medium having a thick substrate thickness or a low recording density is used.

6. An information recording apparatus for recording information on at least two kinds of information storage media having different substrate thicknesses or different recording densities, comprising the optical pickup according to claim 3, wherein the polarization control unit supplies the light beam of the first polarization direction to the polarization hologram lens when an information storage medium having a thin thickness substrate or a high recording density is used, and supplies the light beam of the second polarization direction to the polarization hologram lens when an information storage medium having a thick substrate thickness or a low recording density is used.

7. A polarization hologram lens comprising:
a circular central portion for passing a light beam of both first polarization direction and a second polarization direction perpendicular to the first polarization direction without diffraction; and
an outer portion surrounding the circular central portion for passing the light beam of the first polarization direction without diffraction and passing the light beam of the second polarization direction with diffraction to produce diffracted light beams, wherein the outer portion comprises concentric circular grating patterns comprising plural arc patterns produced from a portion of concentric circular patterns defined around a center position, the portion being offset a predetermined amount from a center of the concentric circular patterns, wherein the outer portion produces ±1$^{st}$ order diffracted lights which are incident upon an information recording surface of an information storage medium in a defocused state.

8. A polarization hologram lens according to claim 7, wherein the outer portion comprises a dual-layered structure comprising proton exchange areas and dielectric films.

9. An optical pickup comprising:
a light beam producing unit for producing a light beam of a first polarization direction and a light beam of a second polarization direction;
a switching unit for outputting the light beam of one of the first and the second polarization directions; and
a lens system, including a polarization hologram lens and an objective lens, for converging the light beam outputted by the switching unit on an information recording surface of an information storage medium, wherein the lens system converges the light beam of the first polarization direction on the information recording surface in a focused manner with a first numerical aperture, and wherein the lens system converges the light beam of the second polarization direction in a focused manner with a second numerical aperture smaller than the first numerical aperture, wherein the lens system comprises:
a first portion, positioned at a center of said hologram lens, on which no grating pattern is formed; and
a second portion, positioned at an outer circumferential area of the first portion, on which concentric circular grating patterns are formed, wherein the concentric circular grating patterns do not diffract a light beam of a first polarization direction, and wherein the concentric circular grating patterns diffract a light beam of a second polarization direction perpendicular to the first polarization direction to produce a diverging diffracted light or a converging diffracted light, wherein the concentric circular grating patterns comprise plural arc patterns produced from a portion of concentric circular patterns defined around a center position, the portion being offset a predetermined amount from a center of the concentric circular patterns.

10. The optical pickup according to claim 9, wherein the lens system diffracts a part of the light beam of the second polarization direction to produce a diffracted light and converges the diffracted light on the information recording surface in a defocused manner.

11. The optical pickup according to claim 9, wherein the light beam producing unit comprises a light source for emitting a light beam, and a polarization unit for polarizing the light beam from the light beam source to selectively produce the light beam of one of the first polarization direction and the second polarization direction.

12. The optical pickup according to claim 9, wherein the light beam producing unit comprises a first light source for emitting the light beam of the first polarization direction and the second light source for emitting the light beam of the second polarization direction.

13. An optical pickup according to claim 9, wherein the second portion produces $\pm 1^{st}$ order diffracted lights which are incident upon an information recording surface of an information storage medium in a defocused state.

14. An optical pickup according to claim 9, wherein the second portion comprises a dual-layered structure comprising proton exchange areas and dielectric films.

15. The optical pickup according to claim 9, wherein
the grating patterns are asymmetrical with respect to the center position of the polarization hologram lens so that one of +1st order diffracted light and −1st order diffracted light is converged at nearer position from a converging point of a 0th order diffracted light and the other is converged at farther position from said converging point.

16. A polarization hologram lens comprising:
a first portion, positioned at a center of said holograms lens, on which no grating pattern is formed; and
a second portion, positioned at an outer circumferential area of the first portion, on which concentric circular grating patterns are formed, wherein the concentric circular grating patterns do not diffract a light beam of a first polarization direction, and wherein the concentric circular grating patterns diffract a light beam of a second polarization direction perpendicular to the first polarization direction to produce a diverging diffracted light or a converging diffracted light, wherein the concentric circular grating patterns comprise plural arc patterns produced from a portion of concentric circular patterns defined around a center position, the portion being offset a predetermined amount from a center of the concentric circular patterns,
wherein the grating patterns are asymmetrical with respect to the center position of the polarization hologram lens so that one of +1st order diffracted light and −1st order diffracted light is converged at nearer position from a converging point of a 0th order diffracted light and the other is converged at farther position from said converging point.

17. A polarization hologram lens comprising:
a circular central portion for passing a light beam of both first polarization direction and a second polarization direction perpendicular to the first polarization direction without diffraction; and
an outer portion surrounding the circular central portion for passing the light beam of the first polarization direction without diffraction and passing the light beam of the second polarization direction with diffraction to produce diffracted light beams, wherein the outer portion comprises concentric circular grating patterns comprising plural arc patterns produced from a portion of concentric circular patterns defined around a center position, the portion being offset a predetermined amount from a center of the concentric circular patterns,
wherein the grating patterns are asymmetrical with respect to the center position of the polarization hologram lens so that one of +1st order diffracted light and −1st order diffracted light is converged at nearer position from a converging point of a 0th order diffracted light and the other is converged at farther position from said converging point.

* * * * *